Figure 1:
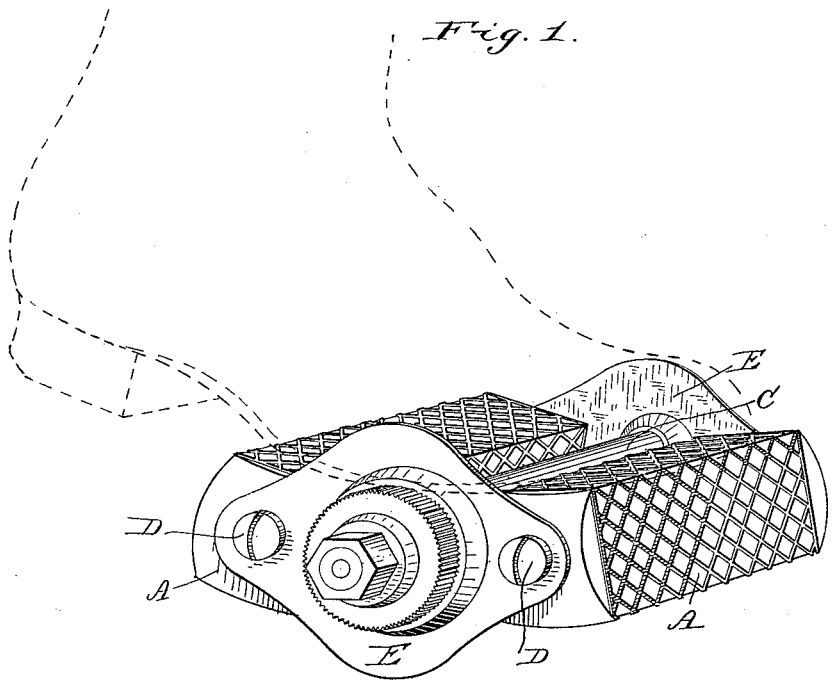

(No Model.)  A. H. OVERMAN.  2 Sheets—Sheet 1.

PEDAL FOR VELOCIPEDES.

No. 329,851.  Patented Nov. 3, 1885.

(No Model.) 2 Sheets—Sheet 2.

A. H. OVERMAN.
PEDAL FOR VELOCIPEDES.

No. 329,851. Patented Nov. 3, 1885.

WITNESSES:
Edward H Rogers
C. L. Swan Jr.

INVENTOR
Albert H. Overman
BY Geo. W. Seymour
ATTORNEY

UNITED STATES PATENT OFFICE.

ALBERT H. OVERMAN, OF CHICOPEE, MASSACHUSETTS.

PEDAL FOR VELOCIPEDES.

SPECIFICATION forming part of Letters Patent No. 329,851, dated November 3, 1885.

Application filed December 22, 1884. Serial No. 150,983. (No model.)

*To all whom it may concern:*

Be it known that I, ALBERT H. OVERMAN, residing at Chicopee, in the county of Hampden and State of Massachusetts, have invented certain new and useful Improvements in Pedals for Velocipedes; and I do declare the following to be a full, clear, and exact description of the same, reference being had to the accompanying drawings, which form a part of this specification.

Heretofore pedals for velocipedes have been provided with a single turning polygonal bar composed of an envelope of rubber inclosing a skeleton frame bearing at each end upon the spindle of the pedal. Pedals for velocipedes have also been provided with two essentially round and sometimes fluted bars of solid rubber located upon opposite sides of the working-bearing of the pedal, and arranged to be turned, so that when one portion has become worn another may be exposed for wear.

Pedals of the construction first mentioned are objectionable in that the single bar does not prevent the boot from slipping, except through friction, which does not procure a sufficient hold for safety. In this pedal also the frame of the bar forms the active or working bearing of the pedal, and is necessarily made of metal, which makes the bar heavy and expensive.

Pedals of the type described as having two essentially round bars located upon opposite sides of their working-bearings are also objectionable, for while the bars are engaged with the sole of the boot at separated points thereupon the area of contact upon an essentially round bar is necessarily small, and the surfaces in contact being in the same horizontal plane the boot is prevented from slipping only by friction, and this being insufficient to retain it in place it often slips. Moreover, the solid rubber bars of this class of pedals are both heavy and expensive.

With the end in view of obviating the objections above stated incident to pedals as heretofore constructed and of producing a pedal retaining the foot in place by other means than friction alone, and of durable and cheap construction, my invention consists in a pedal having bars located upon opposite sides of a central working-bearing, and provided with wide working-faces, and arranged to turn to incline their upper or exposed faces toward each other.

My invention further consists in a pedal having rectangular bars located on opposite sides of a central working-bearing, and arranged to turn to incline their upper or exposed faces toward each other.

My invention further consists in a pedal having bars, each composed of a light core of wood or equivalent material, and an envelope of rubber inclosing the same, and bearings passing through the core of each bar.

Figure 2:
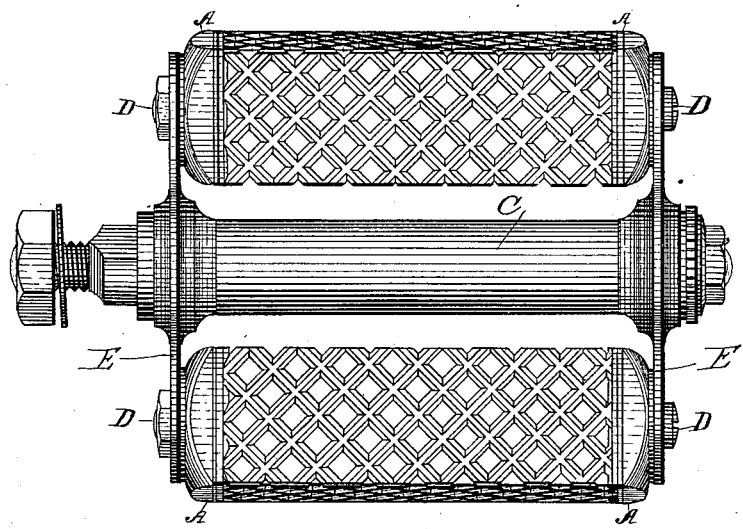
Figure 3:
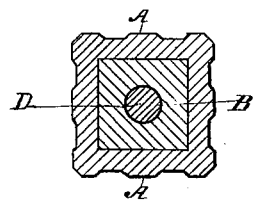

In the accompanying drawings, Figure 1 is a perspective view of a pedal embodying my invention with a portion of a boot outlined in it. Fig. 2 is a plan view of the pedal, and Fig. 3 is a view in transverse section through one of its bars.

As herein shown, the pedal is furnished with a pair of rectangular bars, each composed of a rubber envelope, A, having a friction-surface formed by intersecting elevations, and a core, B, inclosed by the said envelope. The said bars are respectively located upon opposite sides of the central working-bearing, C, of the pedal, and arranged to turn upon their bearings D D, which are mounted in the sides E E thereof. By locating bars having flat bearing-surfaces upon opposite sides of the working-bearing of the pedal and arranging them to swivel upon their bearings they will turn toward each other and incline their upper or exposed bearing-surfaces to meet the sole of the boot at the points of contact therewith and retain the foot in place not only by the friction of the broad flat bearing-surfaces, but also by the inclination of the same in converging planes, as shown in Fig. 1 of the drawings, whereby ease to the foot and security against slipping are secured.

Any polygonal bar offering bearing-surfaces of good width may be employed in my improved pedal. The rectangular shape herein shown is commended by its provision of four bearing-surfaces and its compact form.

The provision of the bars with light cores makes them more durable, lightens them, and reduces the expense of their production by lessening the weight of the rubber required.

Wood, paper, or other equivalent material may be employed for such cores.

The invention comprehends the employment of more than two bars; and I would have it understood that I do not limit myself to the exact construction shown and desbribed, but hold myself at liberty to make such changes and alterations as fairly fall within the spirit and scope of my invention.

Having fully described my invention, what I claim as new, and desire to secure by Letters Patent, is—

1. A pedal for velocipedes, having bars located upon opposite sides of a central working-bearing, and provided with wide working-faces, and arranged to turn to incline the upper or exposed faces toward each other, substantially as set forth.

2. A pedal for velocipedes, having rectangular bars located upon opposite sides of a central working-bearing, and arranged to turn to incline their upper or exposed faces toward each other, substantially as set forth.

3. A pedal for velocipedes, having bars each composed of a light core of wood or equivalent material, and an envelope of rubber inclosing the same, and bearings passing through the core of each bar, substantially as set forth.

In testimony whereof I have signed this specification in the presence of two subscribing witnesses.

ALBERT H. OVERMAN.

Witnesses:
CHAS. L. PEPPER,
ROLAND T. OAKES.